Patented June 11, 1935

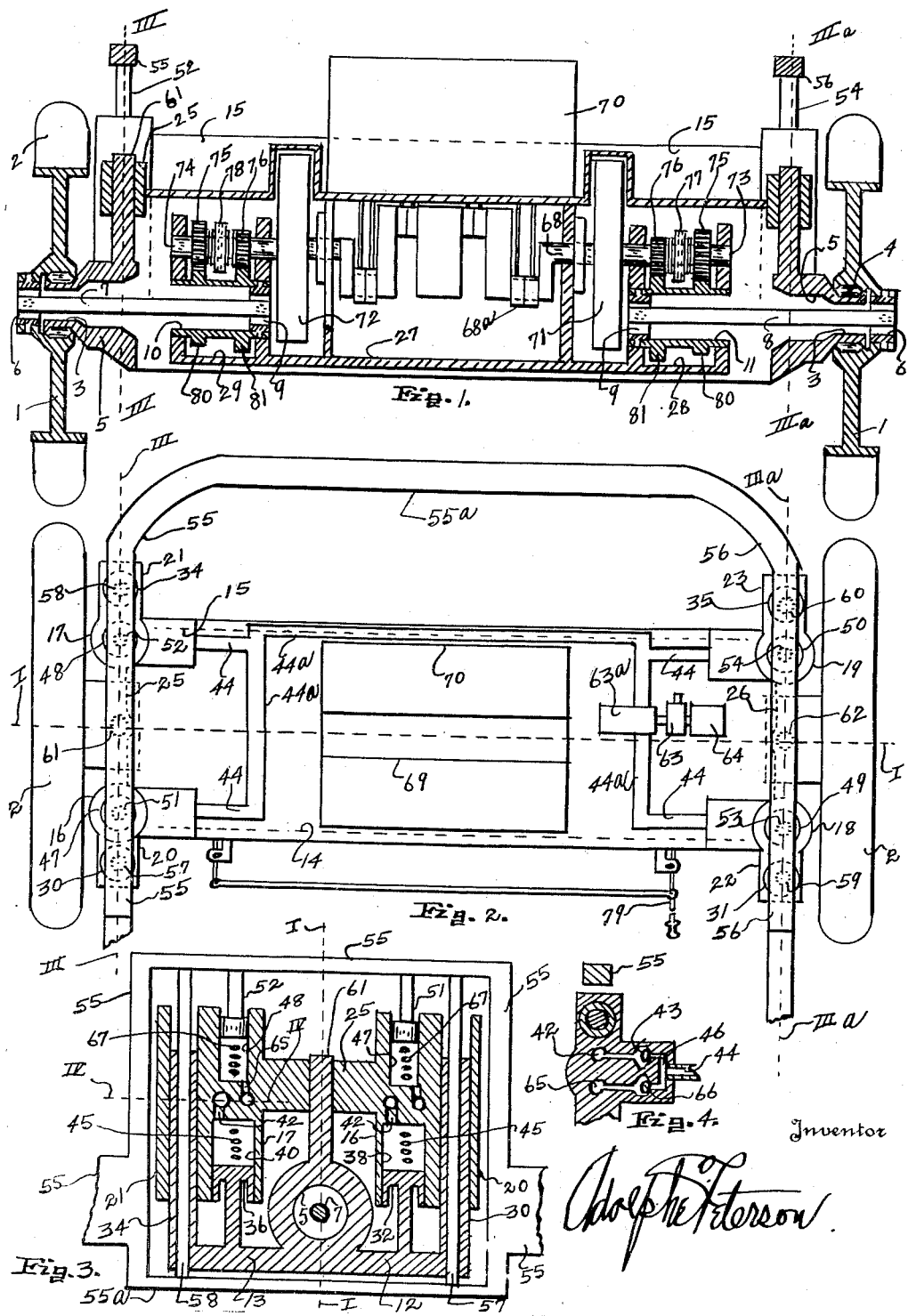

2,004,215

UNITED STATES PATENT OFFICE 2,004,215

UNIT ASSEMBLY ENGINE AND DRIVE MEANS

Adolphe C. Peterson, Minneapolis, Minn.

Application June 16, 1933, Serial No. 676,157

18 Claims. (Cl. 180—57)

My invention relates to automotive engines and driving means and particularly to a unit form of assembly and drive means wherefore it is called unit assembly engine and drive means.

The particular objects of my invention are to provide a novel form of engine and drive means for automotive vehicles which shall be simple in construction, cheap in manufacture, and efficient in use. A principal object is to provide a novel form of such assembly which shall be particularly adapted to use as a rear engine and drive means for automobiles. A principal object is to provide such an assembly which shall have a novel form of suspension of the engine relative to the wheels and a novel form of suspension of the chassis frame relative to the engine, or in general to provide an improved form of automobile chassis suspension which shall be capable of providing more flexible suspension for the automobile and which shall at the same time provide a lighter means for such suspension. An object is to provide a novel form of suspension whereby much weight is saved in the form of suspension. An object is to provide a novel form of drive means for use particularly in connection with rear drive automobiles.

The particular devices and combinations of devices comprising my invention are as hereinafter described and as defined in the claims. In the accompanying drawing which illustrates my invention like characters refer to like parts throughout the several views.

Referring to the drawing:

Figure 1 is a view chiefly in vertical section on the axial centers of the driving wheels of an automobile, this view showing some parts in full side elevation and some parts broken away, on line I—I of Figures 2 and 3.

Figure 2 is a plan view of the means shown in Figure 1, this plan view illustrating only the rear part of a chassis to which the device is related, the side members of the chassis being broken away as shown.

Figure 3 is a view in detail section on the line III—III of Figures 1 and 2 and it will be noted that a section on the line IIIa—IIIa would be substantially similar.

Figure 4 is a horizontal section on line IV—IV of Figure 3.

Referring again to the drawing, the numeral 1 indicates the rear wheels or road wheels of an automobile, and related to each rear wheel there is its tire 2 (diagrammatically shown), its tubular individual axle or spindle 3, roller bearings 4 between the spindle and the wheel, and the strong spanner or tubular member 5 for each wheel. Each rear wheel 1 has axially located in the outer end of its spindle a universal joint 6 one member of which is rotatably secured to the wheel and the other member to a related short propeller shaft, that related to one wheel being designated 7 and that related to the other wheel being designated 8.

The propeller shafts 7 and 8 are relatively short as shown and each has at its inner end also rotatively secured to it another universal joint 9 by which the inner end of the respective propeller shaft is rotatively secured to the inner end of a short tubular so-called counter or secondary shaft 10 and 11 respectively. The latter shafts are each placed so that it is at or near one side of the space between the road wheels 1.

The road wheels 1 render support by means of their tubular members 5 to an engine assembly and thereby to the chassis in the manner hereinafter described. Each of the two tubular members 5 have firmly secured thereto or constructed integrally therewith the forwardly and rearwardly extending brackets, 12 being the forward bracket and 13 the rear bracket of each member 5. There is formed by welding or riveting together or casting a main so-called drive and axle casing which is comprised chiefly of two main longitudinal members 14 and 15, which are wide and strong metal beams which are of sheet-like form vertically and which are nearly as long transversely of the chassis as the distance between the road wheels 1. There are formed with or secured to the ends of the longitudinal members 14, 15 four so-called air-spring castings or members, 16, 17, 18, 19, each of which is substantially one end of one member 14, 15 and each of which is vertically stationed and has fixed to and related to it a vertical cylindrically bored slide-guide 20, 21, 22, 23. There also extends between the pair of air-spring castings at each end of the longitudinal members the so-called central slide-guide members 25 and 26. The longitudinal members 14, 15 have mounted between them and secured firmly thereto a single casting of aluminum or iron or steel or a plurality of such castings which constitute an engine crank case 27, one side transmission case 28 and the other side transmission case 29. The casings, crank case, and side transmission cases may be made of only vertical and horizontal members passing between the longitudinal members 14, 15, and the latter members will at the sides constitute the sides or covers for the cases described. That is these cases 27, 28, 29 need only be such vertical bearing members and horizontal members as are necessary to join such members together rigidly, and in the assembly with the longitudinal members they are welded thereto if found advisable but they are preferably bolted thereto by long bolts (substantially the thickness of the assemblage) passing through the cases and the longitudinal members 14, 15.

The forward bracket 12 of each member 5 is rigidly joined to a vertically extending slide support 30, 31 respectively, and also a vertically extending spring piston 32. Each tubular member has its related spring piston 32. The rear bracket 13 of each member 5 is rigidly joined to a vertically extending slide support 34, 35 respectively, and also to a vertically extending spring piston 36. Each tubular member 5 has its related spring piston 36. The spring pistons 32, 36, are vertically reciprocable in cylinders 38, 40, related in the pair of air-spring castings at each end of the longitudinal members 14, 15 and each cylinder may freely receive air under pressure by passage 42 related by means of a port controlled by related check valve 43 which respectively will prevent return by that passage to the related conduits 44. Each spring cylinder 38, 40, may have discharge of air therefrom by means of a plurality of ports 45, related in the side wall of the cylinder, which ports 45 deliver to the vertical passage 46 which is in the related air spring casting and which passage 46 is always in free communication with the related conduit 44, but these ports in each spring cylinder are adapted to be successively covered by vertical upward movement of the related spring piston and thus the area of free port communication with the passage 46 and thus with conduit 44 will gradually be restricted as the spring piston and thus the area of free port comder and at the extreme upper end of the movement communication would be blocked entirely.

Each air-spring casting 16, 17, 18, or 19 has formed in it vertically above its related spring cylinders 38, 40 at the ends of longitudinal members 14, 15, supplementary spring-cylinders 47, 48, 49 or 50, respectively, each of a smaller diameter than its related spring cylinder 38, or 40 and each having related and vertically reciprocable within it a supplementary spring piston 51, 52, 53 or 54 respectively. The latter supplementary spring pistons support above them the longitudinal chassis members 55 or 56, only the rear ends of such members being shown in the drawing.

The longitudinal chassis members 55, 56 have lower stabilizing members 55a, which are secured to the respective related chassis member and which are secured rigidly to the lower ends of chassis guide rods 57, 58, 59, 60 which are secured at their upper and lower ends to the one of the chassis members 55, or 56 and which are vertically slidable in a vertical bore in the slide supports 30, 31 or 34, 35, there being one guide rod vertically reciprocable in each slide support. Each tubular member 5 has extending vertically from it above its axis and secured thereto a central slide support 61, which forms an upper and central guide support for the member 5, these central slide supports 61 being vertically reciprocable in the central slide guide members 25 and 26, respectively. Thus each member 5 has a slidable support vertically in the two ends adjacent of the longitudinal members 14, 15 and this slidable support is cushioned or made yieldably effective by means of the spring pistons acting in their related spring cylinders, the longitudinal members 14, 15 with their engine crank case and engine and transmission cases being yieldably supported relatively to the road wheels 1. The chassis members 55, 56 are independently yieldably supported upon the engine or drive assembly of the longitudinal members 14, 15 by the supplementary spring pistons acting vertically in the supplementary spring cylinders. The air in the spring cylinders and supplementary spring cylinders is maintained at a high pressure (sufficient for the purpose of yieldable support) by means of an air compressor 63 drawing air from atmosphere and driven by electric motor 64 under control of any automatic regulator or any manual control means to furnish electric current from a battery or any source of current. The supplementary spring cylinders also have passages 65 controlled by check valves 66 to permit free delivery from the conduits 44 and side wall ports 67 to permit gradually restricted discharge to the conduits 44. A receiver 63a interposed between the air-compressor 63 and conduits 44—44a assists in maintaining air pressure in conduits 44—44a sufficient at all times for the yieldable support provided by the spring cylinders and the supplementary spring cylinders.

The engine crank case 27 supports in it as by bearings the engine crank shaft 68 which by related connecting rods (8 in number) is driven by pistons not shown in the two four cylinder engine blocks 69, 70, these being supported as V type blocks of an eight cylinder V type engine. This engine is only diagrammatically shown and exerts its driving power by means of two (Foettinger hydraulic type) fluid clutches 71, 72 one at each end of the crank shaft 68 to transmission primary shafts 73 and 74 respectively, this drive by means of the fluid clutches being therefore of a yieldable type. These fluid clutches 71, 72 have each the primary drive member which has its vanes to procure centrifugal effect on the contained liquid and each has its secondary or supplementary driven member which also has its vanes to receive the driving effect from the primary member. The fluid clutches are shown diagrammatically only since they are of the known type and illustration is therefore not deemed necessary as the invention lies in the use of these fluid clutches in the manner shown.

The transmission primary shafts 73, 74 are located each at one end of the space between the longitudinal members 14, 15, thus one is between the engine and road wheel at one side of the chassis and the other between the engine and the road wheel at the other side of the chassis. The transmission primary shafts 73, 74 are rotatably mounted in the transmission cases 28, 29 as on bearings on axes which extend horizontally and transversely of the chassis, and each has two free spur gears 75, 76, respectively, and each has a dog clutch 77, 78 by means of which the spur gears may be clutched to the primary shaft, these dog-clutches being simultaneously located either in neutral or in position for high or low speed drive by the common lever 79. Each spur gear 75, and 76 of each transmission case is in constant drive with related spur gears 80, 81 of the secondary shafts 10 or 11 respectively. Thus the engine may drive the two road wheels by means of a fluid clutch and transmission means and a related short propeller shaft at each side of the chassis. Thus the engine and transmission shafts are supported as a unit with the longitudinal members 14, 15, the universal members of the tubular secondary shafts providing flexibility.

I have shown no means for control of the engine it being contemplated that this will have the usual control means for control of its action by throttling or varying of fuel delivery.

The longitudinal members 14, 15 with their contained rigidly secured crank and transmission cases constitute a rigid engine and axle assembly which serves four purposes: the support of the engine, the yieldable support of the chassis thereupon, and the yieldable support of the engine assembly upon the wheels and the rigid retention of the road wheels in their relative vertical positions while vertically reciprocable.

The air springs and the supplementary air springs provide a double yieldable support for the chassis and automobile body (not shown) thereupon by means of the chassis members 55, 56 and this double yieldable support is such that a stronger yieldable support is formed by the lower spring cylinders for the engine and a lighter and yieldable support is formed for the chassis and body upon the engine assembly. And by this assembly there is provided a compact and simple form of rear drive assembly for the rear drive automobiles. It is to be noted however that my means may be used also for front wheel drive automobiles, in which case the road wheels would be provided with the usual form of vertical axis or spindle for steering of the road wheels.

While I have shown particular devices and combinations of devices in the illustration of my invention I contemplate that other detailed devices and combinations of devices may be used in the realization of my invention without departing from the spirit and contemplation thereof.

What I claim is:

1. The combination of a pair of road wheels, a pair of transverse members extending between the road wheels, means whereby the road wheels are guidably and yieldably supported one at each end of the transverse members, an engine supported by the transverse members and means for transmitting propulsive effort from the engine to the road wheels comprising a pair of fluid clutches each having a correlated driving element and variable transmission means in cooperation with a correlated one of the road wheels.

2. The combination of a pair of road wheels, an engine supported yieldably on the pair of road wheels and having a rotational shaft, a pair of fluid clutches each having one element driven by the engine and each having another element fluid driven, and a pair of variable drive transmission means each for transmitting propulsive effort from one of the fluid driven elements to one of the road wheels.

3. The combination of a pair of road wheels, an engine supported yieldably on the pair of road wheels and having a rotational shaft, a pair of fluid clutches each having one element driven by the engine and each having another element fluid driven, a pair of variable drive transmission means each for transmitting propulsive effort from one of the fluid driven elements to one of the road wheels, and means for controlling the variable drive transmission means for uniform change to predetermined ratios of drive to the road wheels.

4. In an automotive vehicle, the combination of pair of road wheels, an engine mounted between the pair of road wheels with its rotational axis substantially parallel to the axes of the road wheels, means on the engine comprising a support for vertical slidable mounting of the wheel axles of the road wheels at each end of the engine, and a pair of transmission elements providing a flexible drive between the engine and each of the road wheels.

5. In an automotive vehicle, the combination of a pair of road wheels, an engine mounted between the pair of road wheels with its rotational axis substantially parallel to the axes of the road wheels, means on the engine comprising a support for vertical slidable mounting of the wheel axles of the road wheels at each end of the engine and yieldable means interposed between the end of the engine and the wheel axle, a chassis frame mounted upon the engine for support at one end, and a transmission means providing a reduction drive and flexible transmission to each of the road wheels.

6. In an automotive vehicle, the combination of a pair of road wheels, an engine mounted between the pair of road wheels, means on the engine comprising a support for vertical slidable mounting of the wheel axles of the road wheels at each end of the engine and yieldable means interposed between the end of the engine and the wheel axle, and an automobile body carrier mounted at one end by a yieldable support upon the engine.

7. In an automotive vehicle, the combination of a pair of road wheels, an engine mounted between the pair of road wheels, means on the engine comprising a support for vertical slidable mounting of the wheel axles of the road wheels at each end of the engine and yieldable means interposed between the end of the engine and the wheel axle, and an automobile body carrier mounted at one end by a compressible fluid container for yieldable support upon the engine.

8. In an automotive vehicle, the combination of a pair of road wheels, an engine mounted between the pair of road wheels, means on the engine comprising a support for vertical relative movement of the road wheels, a yieldable element yieldably mounting the engine upon the road wheels, an automobile body carrier mounted by one end on the engine, and a yieldable guiding means provided to yieldably mount the automobile body carrier upon the engine.

9. The combination of an engine having a rigid casing transversely of an automobile, a pair of road wheels one at each end of the rigid casing, a guide means for each road wheel for maintenance of the road wheel vertically at the end of the rigid casing, a fluid container at each end of the rigid casing providing yieldable support for the related end of the rigid casing on the road wheel, and a fluid container at each end of the rigid casing providing yieldable support for the related side of a vehicle body carrier upon the rigid casing.

10. The combination of an engine having a rigid supporting frame transversely of an automobile, a pair of road wheels one at each end of the rigid supporting frame, a guide means for each road wheel for maintenance of the road wheel vertically at the end of the rigid casing and comprising a fluid container providing yieldable support for the related end of the rigid supporting frame on the road wheel, and a fluid container at each end of the rigid supporting frame providing yieldable support for a vehicle body carrier upon the rigid supporting frame, the yieldable support between the engine and road wheels providing greater weight support than the yieldable support between the rigid supporting frame and the vehicle body carrier.

11. In an automotive vehicle, a transverse frame at one end and an engine carried by the transverse frame, a fluid containing cylinder and cooperating piston one secured to one end of the transverse frame and the other secured to a road wheel axle bearing a road wheel rotatable thereon to yieldably mount the transverse frame on the road wheel, a fluid container cylinder and cooperating piston one secured to the other end of the transverse frame and the other secured to a road wheel axle bearing a road wheel rotatable thereon to yieldably mount the transverse frame on the road wheel, and means whereby the engine may drive the road wheels.

12. The novel means described in claim 11 and another pair of fluid containing cylinders and cooperating pistons, an element of each pair secured to the body carrier of automotive vehicle and the other element secured to the transverse frame.

13. In an automobile, the combination of a pair of road wheels, a pair of transverse members extending between the road wheels, a wheel axle for each wheel supported for vertical slidable movement in the related end of the transverse members, an engine supported by the transverse members and disposed with its rotational shaft transversely of the automobile, a fluid clutch at each end of the engine shaft, and a flexible transmission means between each fluid clutch and the respective road wheel.

14. In an automotive vehicle, the combination of a pair of road wheels, an engine between the pair of road wheels having its rotational shaft transversely of the automotive vehicle, means whereby the road wheels are guidably supported by the engine one adjacent each end thereof and whereby the engine with its correlated vehicle body is yieldably supported by the road wheels, and means for transmitting propulsive effort from the engine to the pair of road wheels.

15. In an automotive vehicle, the combination of a pair of road wheels, an engine between the pair of road wheels having its rotational shaft transversely of the automotive vehicle, means whereby the road wheels are guidably supported by the engine one adjacent each end thereof and whereby the engine with its correlated vehicle body is yieldably supported by the road wheels, and means for transmitting propulsive effort from the engine to the pair of road wheels comprising a pair of fluid clutches each having a correlated driven element and variable transmission means in cooperation with a correlated one of the road wheels.

16. In an automotive vehicle, the combination of a pair of road wheels, an engine between the pair of road wheels having its rotational shaft transversely of the automotive vehicle, means whereby the road wheels are guidably supported by the engine one adjacent each end thereof and whereby the engine with its correlated vehicle body is yieldably supported by the road wheels, and means for transmitting propulsive effort from the engine to the pair of road wheels comprising a pair of fluid clutches one having its driving element attached to one end of the engine rotational shaft and the other having its driving element attached to the other end of the engine rotational shaft and each having its driven element in cooperation with a correlated one of the road wheels through an intermediate correlated variable transmission means.

17. In an automotive vehicle, the combination of a vehicle body and a pair of road wheels, an engine frame between the pair of road wheels transversely of the vehicle and having supported on it the engine with its rotational shaft transversely of the vehicle, a pair of road wheel guide units one at each end of the engine frame and each comprising a pair of fluid containing cylinders vertically disposed and a central slide guide, and in combination a spindle unit for each road wheel, each spindle unit comprising an attached pair of vertical pistons reciprocable in the fluid containing cylinders and a centrally disposed slide rod vertically reciprocable in the central slide guide, and means for transmitting propulsive effort from the engine to the pair of road wheels.

18. In an automotive vehicle, the combination of a vehicle body and a pair of road wheels, a frame between the road wheels transversely of the vehicle, a pair of road wheel guide units one at each end of the frame and each comprising a pair of fluid containing cylinders vertically disposed and a central slide guide, and in combination a spindle unit for each road wheel, each spindle unit comprising an attached pair of vertical pistons reciprocable in the fluid containing cylinders and a centrally disposed slide rod vertically reciprocable in the central slide guide.

ADOLPHE C. PETERSON.